US012784466B2

(12) United States Patent
Mitsui et al.

(10) Patent No.: US 12,784,466 B2
(45) Date of Patent: Nov. 3, 2026

(54) VEHICLE CONTROL DEVICE, CONTROL METHOD, AND COMPUTER READABLE MEDIUM STORING CONTROL PROGRAM

(71) Applicant: HONDA MOTOR CO., LTD., Tokyo (JP)

(72) Inventors: Tomokazu Mitsui, Tokyo (JP); Yuki Kizumi, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 19/064,730

(22) Filed: Feb. 27, 2025

(65) Prior Publication Data

US 2025/0308254 A1 Oct. 2, 2025

(30) Foreign Application Priority Data

Mar. 28, 2024 (JP) ................................ 2024-054224

(51) Int. Cl.
*G06V 20/58* (2022.01)
*B60W 30/18* (2012.01)

(52) U.S. Cl.
CPC ..... *G06V 20/584* (2022.01); *B60W 30/18154* (2013.01); *B60W 2556/40* (2020.02)

(58) Field of Classification Search
CPC .......... G06V 20/584; B60W 30/18154; B60W 2556/40; B60W 2555/60; B60W 40/04; B60W 60/0015; G08G 1/0969; G08G 1/095
USPC ........................................................... 701/70
See application file for complete search history.

(56) References Cited

U.S. PATENT DOCUMENTS

2017/0103275 A1 4/2017 Yamanoi et al.

FOREIGN PATENT DOCUMENTS

JP 6337961 B2 6/2018

*Primary Examiner* — Hai H Huynh
(74) *Attorney, Agent, or Firm* — Paratus Law Group, PLLC

(57) ABSTRACT

A vehicle control device includes: a recognition unit; an acquisition unit; a processing unit; and a vehicle control unit as defined herein, the acquisition unit is configured to acquire the traffic light information at a predetermined cycle based on a recognition result by the recognition unit at each cycle and store the traffic light information in the storage unit, and in a case where plural pieces of the traffic light information are stored in the storage unit, the processing unit sets a traffic light present range serving as a condition for determining a traffic light corresponding to the travel path based on the plural pieces of the traffic light information, and determines whether the recognized traffic light is a traffic light corresponding to the travel path based on the traffic light information on the recognized traffic light and the set traffic light present range.

10 Claims, 11 Drawing Sheets

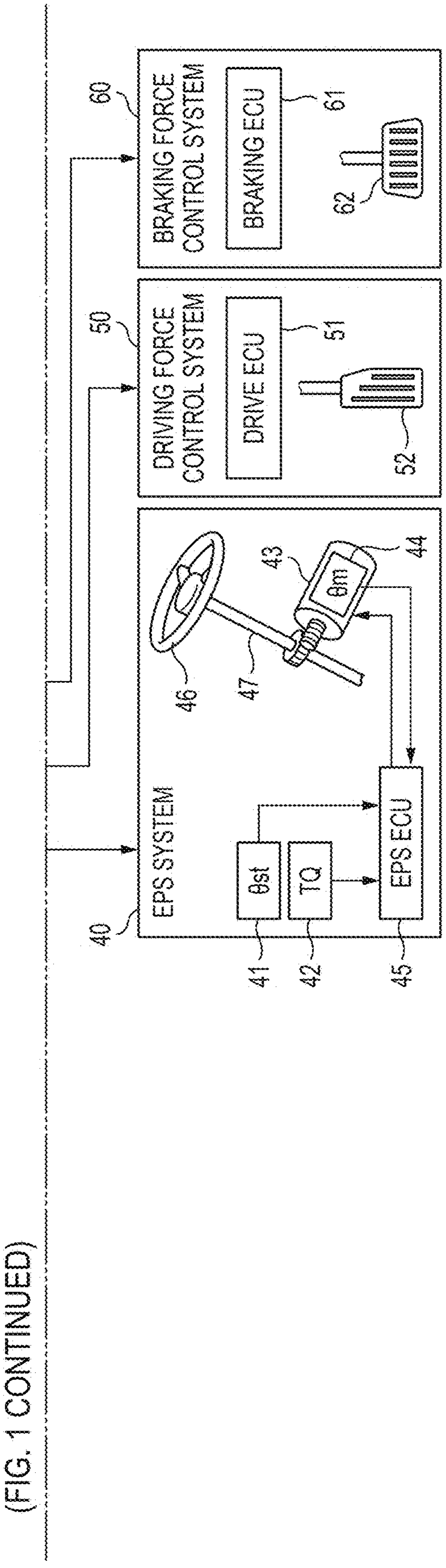
(FIG. 1 CONTINUED)

*FIG. 2*

35a

| | TRAFFIC LIGHT INFORMATION ID | TRAFFIC LIGHT POSITION | NEAREST NODE | COLOR | ACQUISITION TIME |
|---|---|---|---|---|---|
| 35a_1 | 001 | x1, y1 | Nd1 | GREEN | 10:10:01, MARCH 1, 2024 |
| 35a_2 | 002 | x2, y2 | Nd1 | GREEN | 10:10:02, MARCH 1, 2024 |
| | ⋮ | ⋮ | ⋮ | ⋮ | ⋮ |

(CONT.)

(FIG. 9 CONTINUED)
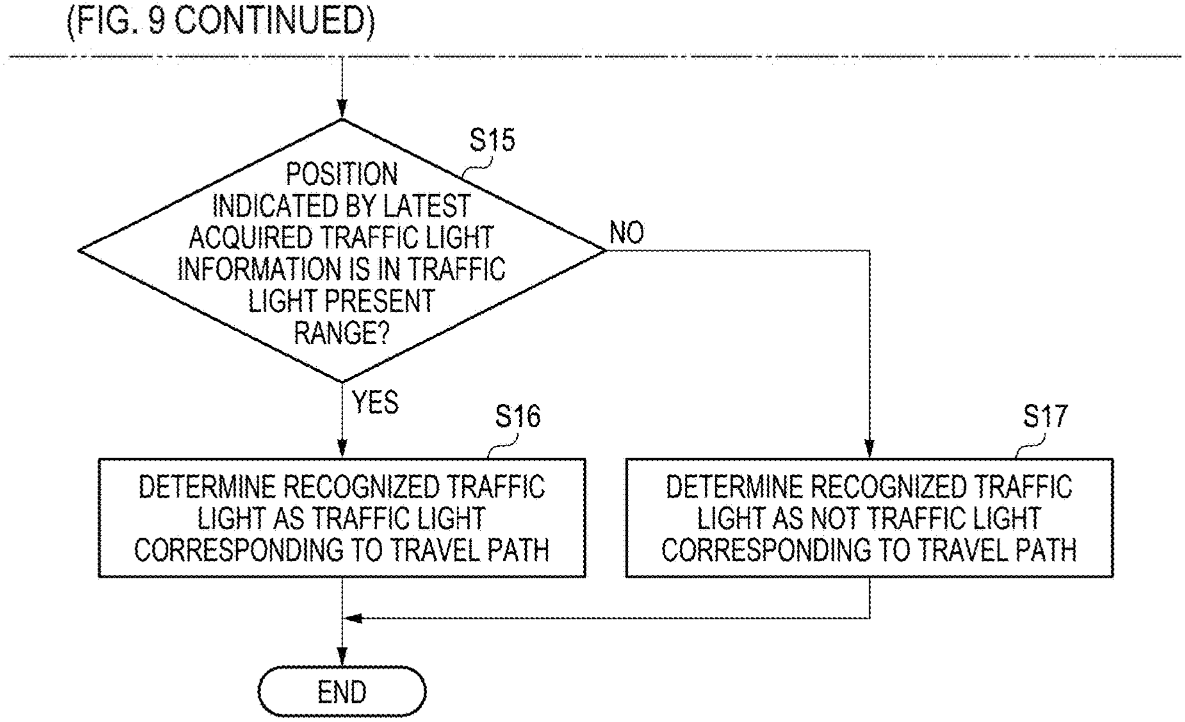

VEHICLE CONTROL DEVICE, CONTROL METHOD, AND COMPUTER READABLE MEDIUM STORING CONTROL PROGRAM

CROSS-REFERENCE TO RELATED APPLICATION

This application is based on and claims priority under 35 USC 119 from Japanese Patent Application No. 2024-054224 filed on Mar. 28, 2024.

TECHNICAL FIELD

The present invention relates to a vehicle control device, a control method, and a computer readable medium storing a control program for controlling a vehicle.

BACKGROUND ART

In recent years, active efforts have been made to provide access to a sustainable transportation system in consideration of vulnerable traffic participants. As one of these efforts, research and development on driving assistance techniques and autonomous driving techniques for vehicles such as automobiles have been made in order to further improve safety and convenience of traffic.

As an example of the driving assistance technology, the following Patent Literature 1 discloses a technique of: identifying two or more traffic lights predicted to appear in an image obtained by imaging the surroundings of a vehicle from a position of the vehicle itself and map information including position information on traffic lights around the vehicle; setting a priority order among the two or more identified traffic lights based on a possibility that the traffic lights are shielded; and detecting a traffic light having a highest priority order among the two or more traffic lights from the image.

PATENT LITERATURE

Patent Literature 1: JP6337961B

SUMMARY OF INVENTION

However, the conventional art described above assumes using map information including the position information on the traffic lights around the host vehicle. Therefore, for a vehicle without being provided with the position information on the traffic lights in advance, it may be not possible to perform appropriate control according to the traffic lights corresponding to the travel path on which the host vehicle travels.

The present invention provides a vehicle control device, a control method, and a computer readable medium storing a control program that enable appropriate control according to traffic lights corresponding to a travel path on which the host vehicle travels even if no position information on the traffic lights is prepared in advance. This further improves safety of traffic and contributes to development of a sustainable transportation system.

An aspect of the present invention is a vehicle control device for controlling a vehicle, including:

a recognition unit configured to recognize a surrounding situation of the vehicle;

an acquisition unit configured to, if a traffic light is recognized by the recognition unit, acquire traffic light information including information indicating a position of the traffic light, and store the traffic light information in a storage unit;

a processing unit configured to determine whether the recognized traffic light is a traffic light corresponding to a travel path on which the vehicle travels, based on the traffic light information acquired by the acquisition unit; and a vehicle control unit configured to control the vehicle based on a processing result of the processing unit, in which the acquisition unit is configured to acquire the traffic light information at a predetermined cycle based on a recognition result by the recognition unit at each cycle and store the traffic light information in the storage unit, and if a plurality of pieces of traffic light information are stored in the storage unit, the processing unit sets a traffic light present range serving as a condition for determining a traffic light corresponding to the travel path based on the plurality of pieces of traffic light information, and determines whether the recognized traffic light is a traffic light corresponding to the travel path based on the traffic light information on the recognized traffic light and the set traffic light present range.

Another aspect of the present invention is a control method of a computer for controlling a vehicle performing processing including:

recognizing a surrounding situation of the vehicle;

if a traffic light is recognized, acquiring traffic light information including information indicating a position of the traffic light, and storing the traffic light information in a storage unit;

determining whether the recognized traffic light is a traffic light corresponding to a travel path on which the vehicle travels, based on the traffic light information; and controlling the vehicle based on a determination result as to whether the recognized traffic light is a traffic light corresponding to the travel path, in which in the processing of acquiring the traffic light information, the traffic light information can be acquired at a predetermined cycle based on a recognition result of the surrounding situation at each cycle and the traffic light information can be stored in the storage unit, and in the processing of determining whether the recognized traffic light is a traffic light corresponding to the travel path, if a plurality of pieces of traffic light information are stored in the storage unit, a traffic light present range serving as a condition for determining a traffic light corresponding to the travel path is set based on the plurality of pieces of traffic light information, and whether the recognized traffic light is a traffic light corresponding to the travel path is determined based on the traffic light information on the recognized traffic light and the set traffic light present range.

Another aspect of the present invention is a computer readable medium storing a control program for causing a computer for controlling a vehicle to perform processing including:

recognizing a surrounding situation of the vehicle;

if a traffic light is recognized, acquiring traffic light information including information indicating a position of the traffic light, and storing the traffic light information in a storage unit;

determining whether the recognized traffic light is a traffic light corresponding to a travel path on which the vehicle travels, based on the traffic light information; and controlling the vehicle based on a determination result as to whether the recognized traffic light is a traffic light corresponding to the travel path, in which in the processing of acquiring the traffic light information, the traffic light information can be acquired at a predetermined cycle based on a recognition result of the surrounding situation at each cycle and the traffic light information can be stored in the storage unit, and in the processing of determining whether the recognized traffic light is a traffic light corresponding to the travel path, if a plurality of pieces of traffic light information are stored in the storage unit, a traffic light present range serving as a condition for determining a traffic light corresponding to the travel path is set based on the plurality of pieces of traffic light information, and whether the recognized traffic light is a traffic light corresponding to the travel path is determined based on the traffic light information on the recognized traffic light and the set traffic light present range.

According to the present invention, it is possible to provide a vehicle control device, a control method, and a computer readable medium storing a control program that enable appropriate control according to traffic lights corresponding to a travel path on which a host vehicle travels even if no position information on the traffic lights is prepared in advance.

BRIEF DESCRIPTION OF DRAWINGS

FIG. 2 illustrates an example of traffic light information stored in the storage unit 35 by the acquisition unit 32.

DESCRIPTION OF EMBODIMENTS

Hereinafter, an embodiment of a vehicle control device, a control method, and a control program of the present invention will be described with reference to the drawings. The drawings are viewed in directions of reference signs. The following embodiment does not limit the present invention, and not all elements described in the following embodiment are essential to the present invention. Further, two or more elements described in the following embodiment may be freely combined without departing from the gist of the present invention. In the following description, the same or similar elements are denoted by the same or similar reference signs, and a description thereof may be omitted or simplified.

In addition, in the present specification, in order to simplify and clarify the description, the directions including front and rear, left and right, up and down directions are described in accordance with a direction viewed from a driver who is an occupant of a vehicle (that is, vehicle 1 to be described later) controlled by a control device (that is, the control device 30 described later) which is an embodiment of the vehicle control device of the present invention, unless otherwise specified.

[1. Vehicle]

Figure 1:
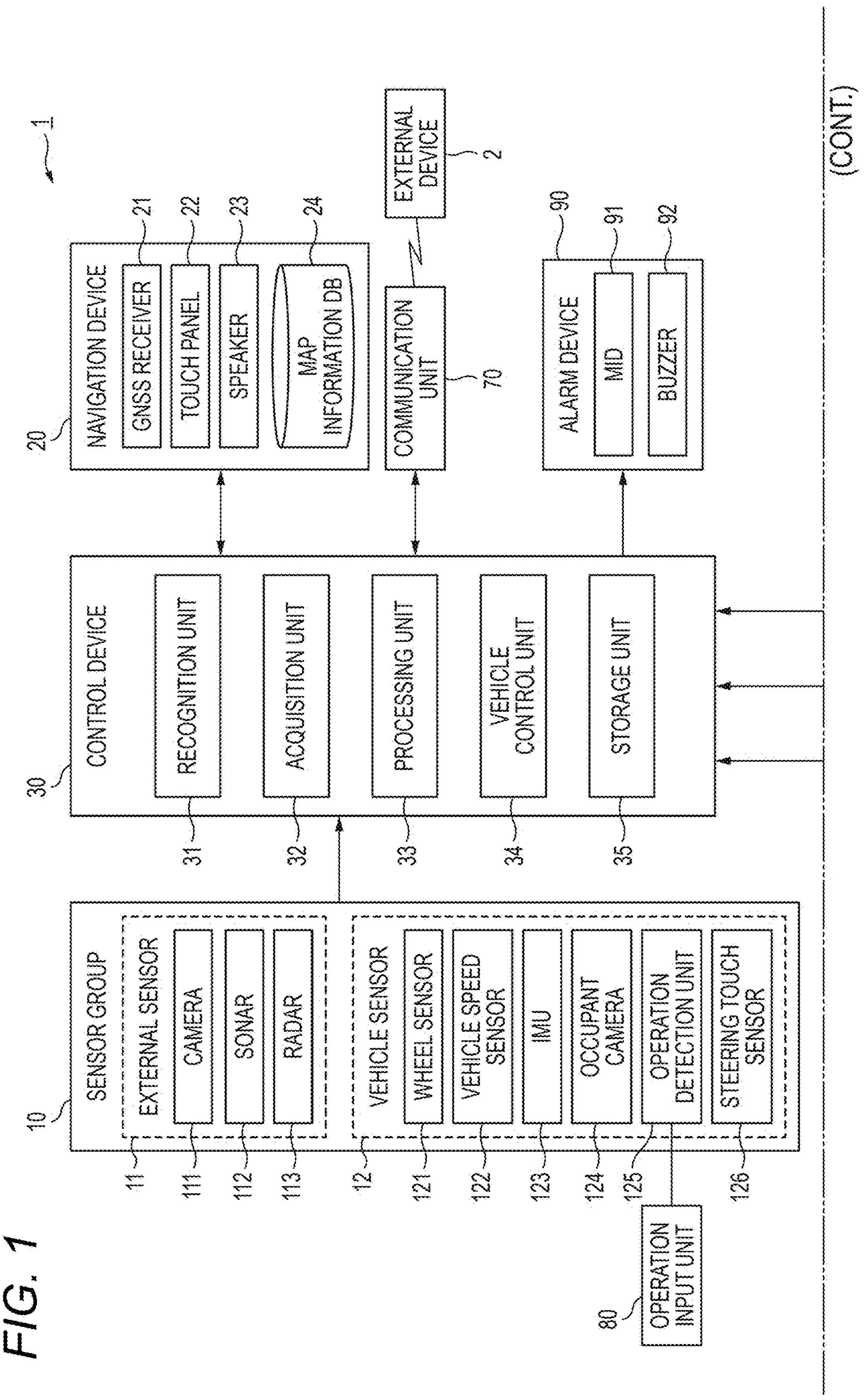
FIG. 1 is a block diagram illustrating a schematic configuration of a vehicle 1 including a control device 30 that is an embodiment of a vehicle control device of the present invention.

FIG. 1 is a block diagram illustrating a schematic configuration of a vehicle 1 including a control device 30 that is an embodiment of a vehicle control device of the present invention. A vehicle 1 according to the present embodiment illustrated in FIG. 1 (hereinafter, also referred to as a "host vehicle") is an automobile including a drive source (not illustrated), and wheels (not illustrated) including drive wheels driven by power of the drive source and steered wheels that are steerable. As an example, the vehicle 1 can be a four-wheeled automobile including a pair of left and right front wheels and a pair of left and right rear wheels.

The drive source of the vehicle 1 may be an electric motor, may be an internal combustion engine such as a gasoline engine or a diesel engine, or may be a combination of an electric motor and an internal combustion engine. The drive source of the vehicle 1 may drive the pair of left and right front wheels, the pair of left and right rear wheels, or four wheels including the pair of left and right front wheels and the pair of left and right rear wheels. Either the front wheels or the rear wheels of the vehicle 1 may be steerable steered wheels, or the front wheels and the rear wheels may all be steerable steered wheels.

The vehicle 1 includes a sensor group 10, a navigation device 20, a control device 30 that is an example of the vehicle control device of the present invention, an electric power steering (EPS) system 40, a driving force control system 50, a braking force control system 60, a communication unit 70, an operation input unit 80, and an alarm device 90.

The sensor group 10 includes an external sensor 11 that acquires information on the surrounding of the vehicle 1 (hereinafter also referred to as "peripheral information"), and a vehicle sensor 12 that acquires information on the vehicle 1 (hereinafter also referred to as "vehicle information"). Information (in other words, detection values) acquired by each sensor in the sensor group 10 is output to the control device 30, and is used for control of the vehicle 1 (hereinafter, also referred to as "vehicle control") performed by the control device 30.

The external sensor 11 includes, for example, a camera 111, a sonar 112, and a radar 113. The camera 111 is an imaging device that images the surroundings of the vehicle 1 including the front of the vehicle 1 and outputs image data of an obtained peripheral image to the control device 30. As the camera 111, for example, a digital camera using an imaging element such as a charge coupled device (CCD) or a complementary metal oxide semiconductor (CMOS) can be adopted.

The sonar 112 emits sound waves around the vehicle 1 (for example, a front, a rear, and lateral sides of the vehicle 1), and receives reflected sounds from an object present around the vehicle 1, thereby detecting a distance to the object, a direction of the object, and the like. The radar 113 emits radio waves to the periphery of the vehicle 1 including the front of the vehicle 1, and receives reflected waves from an object present around the vehicle 1, thereby detecting a distance to the object, a direction of the object, and the like. As the radar 113, for example, a millimeter wave radar can be adopted.

The external sensor 11 may include light detection and ranging (LiDAR) instead of or in addition to the sonar 112 and the radar 113. In this case, the LiDAR emits laser light around the vehicle 1 including the front of the vehicle 1, and receives reflected light from an object present around the vehicle 1, thereby detecting a distance to the object, a direction of the object, and the like.

The vehicle sensor 12 includes, for example, a wheel sensor 121, a vehicle speed sensor 122, an inertial measurement unit (IMU) 123, an occupant camera 124, an operation detection unit 125, and a steering touch sensor 126.

The wheel sensor 121 detects a rotation angle of one or more wheels among the wheels of the vehicle 1. As an example, the wheel sensor 121 detects a rotation angle of each of the left rear wheel and the right rear wheel. As the wheel sensor 121, for example, an angle sensor or a displacement sensor can be adopted.

The vehicle speed sensor 122 detects a vehicle speed VP that is a travel speed of the vehicle 1 (in other words, a movement speed of a vehicle body). For example, the vehicle speed sensor 122 detects the vehicle speed VP based on a rotation speed of a counter shaft (not illustrated) provided in the vehicle 1.

The inertial measurement unit 123 detects angular velocities of the vehicle 1 in a pitch direction, a roll direction, and a yaw direction, and accelerations of the vehicle 1 in a front-rear direction, a left-right direction, and an upper-lower direction. The vehicle sensor 12 may include, instead of the inertial measurement unit 123, an acceleration sensor that detects an acceleration of the vehicle 1 in a predetermined direction and a gyro sensor that detects an angular velocity of the vehicle 1 in a predetermined direction.

The occupant camera 124 is a digital camera that images the interior of the vehicle 1 and outputs image data of the obtained interior image to the control device 30. For example, the occupant camera 124 may be a so-called "driver monitor camera" that is capable of imaging the head of an occupant who sits on the driver's seat of the vehicle 1 (hereinafter, also referred to as a "driver") from the front (in other words, imaging the face). Similarly to the camera 111, a digital camera using an imaging element such as a CCD or a CMOS can be employed as the occupant camera 124.

The operation detection unit 125 detects an operation performed by using the operation input unit 80 that is operable by the driver. In the present embodiment, the operation input unit 80 can include, for example, an operation button (not illustrated) for receiving an operation to switch between on (in other words, operation) and off (in other words, non-operation) of predetermined driving assist control. In this case, the operation detection unit 125 can detect an operation of turning on or off the predetermined driving assist control. Here, the predetermined driving assist control may be, for example, vehicle control performed by a vehicle control unit 34 described later.

The steering touch sensor 126 detects whether a steering 46 of the vehicle 1 is gripped appropriately. For example, the steering touch sensor 126 is implemented by a capacitance sensor or the like. In this case, the capacitance sensor is provided at a portion touched by the driver when the steering 46 is gripped appropriately.

The navigation device 20 includes, for example, a global navigation satellite system (GNSS) receiver 21, a touch panel 22, and a speaker 23. The navigation device 20 includes a storage unit (not illustrated) implemented by a flash memory or the like. The storage unit of the navigation device 20 stores a map information database (DB) 24 as an example of map information and the like.

The map information database 24 includes road network information. The road network information is information representing roads based on a combination of nodes and links connecting the nodes (also referred to as "paths"). Each node in the road network information represents, for example, a feature point on a road such as an intersection, a corner, or a dead end. In the road network information, each node is set with, for example, information indicating a location corresponding to the node (for example, coordinates that enable the identification of one location on a map such as latitude and longitude). In addition, in the road network information, each link is set with information indicating nodes at both ends of the link, a road corresponding to the link, a link length, a lane number, a traveling direction, a road type, and the like.

The GNSS receiver 21 identifies a current position of the vehicle 1 (for example, a latitude and a longitude of a location where the vehicle 1 is located) based on a signals received from a GNSS satellite. For example, the navigation device 20 may acquire a detection result of the vehicle sensor 12 (for example, the wheel sensor 121 or the vehicle speed sensor 122) via the control device 30, and identify or complement the current position of the vehicle 1 by an inertial navigation system (INS) using a detection value of the vehicle sensor 12.

The touch panel 22 is implemented by combining a display device such as a liquid crystal display or an organic light emitting diode (OLED) with a pointing device (for example, touch pad). The speaker 23 is configured to output sound to an occupant (for example, a driver) of the vehicle 1.

For example, the navigation device 20 searches for a route from a current position of the vehicle 1 to a destination set by the driver using the touch panel 22 by referring to the map information database 24. Then, the navigation device 20 performs route guidance using the touch panel 22 and the speaker 23 based on the route searched for. The navigation device 20 may cause the touch panel 22 to perform a predetermined display according to an instruction from the control device 30. Further, the navigation device 20 may output, to the control device 30, information indicating the identified current position of the vehicle 1 or predetermined information (for example, information indicating an operation received via the touch panel 22).

In the present embodiment, the control device 30 is configured to refer to the map information database 24 (that is, map information) of the navigation device 20. However, the present invention is not limited thereto. Map information including road network information similar to that of the map information database 24 may be separately stored in the control device 30 or the like, and the control device 30 may refer to such map information.

The control device 30 is a computer that includes, for example, a processor (not illustrated) configured to perform various calculations, a storage unit (for example, a storage unit 35 described below) having a non-transitory storage medium (for example, a flash memory) for storing various types of information, and an input and output unit (not illustrated) configured to control input and output of data between the inside and the outside of the control device 30, and executes overall control of the vehicle 1. For example, the control device 30 is implemented by one electronic control unit (ECU) or by a plurality of ECUs working in cooperation with each other. Since specific examples of control executed by the control device 30 will be described later, the description thereof will be omitted here.

The EPS system 40 includes a steering angle sensor 41, a torque sensor 42, an EPS motor 43, a resolver 44, and an EPS ECU 45.

The steering angle sensor 41 detects a steering angle θst of the steering wheel 46 and outputs information indicating the detected steering angle θst to the EPS ECU 45. The torque sensor 42 detects a steering torque TQ, which is a torque applied to the steering wheel 46 of the vehicle 1, and outputs information indicating the detected steering torque TQ to the EPS ECU 45.

The EPS motor 43 assists the driver in operating the steering wheel 46 by applying, according to an instruction from the EPS ECU 45, a driving force or a reaction force to a steering column 47 connected to the steering wheel 46. The resolver 44 detects a rotation angle θm of the EPS motor 43 and outputs information indicating the detected rotation angle θm to the EPS ECU 45.

The EPS ECU 45 is a computer that includes, for example, a processor configured to perform various calculations, a storage unit having a non-transitory storage medium for storing various types of information, and an input and output unit configured to control input and output of data between the inside and the outside of the EPS ECU 45 (none illustrated), and controls the EPS system 40 (for example, the EPS motor 43). The EPS ECU 45 is implemented by one or two or more ECUs. For example, the EPS ECU 45 controls the EPS system 40 (for example, the EPS motor 43) based on the steering angle θst detected by the steering angle sensor 41, the steering torque TQ detected by the torque sensor 42, the rotation angle θm detected by the resolver 44, and the like. The EPS ECU 45 may control the EPS system 40 according to an instruction from the control device 30.

The EPS system 40 (for example, the EPS ECU 45) may output, to the control device 30, information indicating the steering angle θst detected by the steering angle sensor 41, the steering torque TQ detected by the torque sensor 42, the rotation angle θm detected by the resolver 44, and the like. Further, the EPS system 40 (for example, the EPS ECU 45) may output information indicating a steering speed w of the steering wheel 46 to the control device 30. In this case, the steering speed ω is obtained by, for example, differentiating the steering angle θst with respect to time.

The driving force control system 50 includes a drive ECU 51, and is configured to control a driving force of the vehicle 1. The drive ECU 51 is a computer that includes, for example, a processor configured to perform various calculations, a storage unit having a non-transitory storage medium for storing various types of information, and an input and output unit configured to control input and output of data between the inside and the outside of the drive ECU 51 (none illustrated), and controls the driving force control system 50. The drive ECU 51 is implemented by one or more ECUs. For example, based on an operation on an accelerator pedal 52 provided in the vehicle 1, the drive ECU 51 controls the power output from the drive source of the vehicle 1. The drive ECU 51 can also control the driving force control system 50 (for example, a drive source) according to an instruction from the control device 30.

The braking force control system 60 includes a braking ECU 61, and is configured to control a braking force of the vehicle 1. The braking ECU 61 is a computer that includes, for example, a processor configured to perform various calculations, a storage unit having a non-transitory storage medium for storing various types of information, and an input and output unit configured to control input and output of data between the inside and the outside of the braking ECU 61 (none illustrated), and controls the braking force control system 60. The braking ECU 61 is implemented by one or more ECUs. For example, the braking ECU 61 controls the braking force of the vehicle 1 by controlling a brake device (not illustrated) provided in the vehicle 1 based on an operation on a brake pedal 62 provided in the vehicle 1. Here, the brake device includes, for example, a brake caliper, a cylinder that transmits a hydraulic pressure to the brake caliper, and an electric motor that generates a hydraulic pressure in the cylinder. The braking ECU 61 controls the electric motor of the brake device such that a braking force corresponding to the operation on the brake pedal 62 is generated. The braking ECU 61 can also control the braking force control system 60 (for example, a brake device) according to an instruction from the control device 30.

The communication unit 70 is a communication interface that communicates with an external device 2 under control executed by the control device 30. That is, the control device 30 may communicate with the external device 2 via the communication unit 70. Examples of the external device 2 can include a terminal device (for example, a smartphone) of the driver and a server device managed by a manufacturer of the vehicle 1. For example, a mobile communication network such as a cellular line, WI-FI (registered trademark), or Bluetooth (registered trademark) can be adopted for communication between the vehicle 1 and the external device 2.

The alarm device 90 is a device that alarms the driver according to the control of the control device 30. The alarm device 90 includes, for example, a multi-information display (MID) 91 and a buzzer 92.

The MID 91 is implemented by a display device such as a liquid crystal display or an OLED, and is provided at a position that the driver can visually recognize (for example, in a meter panel of the vehicle 1). For example, the MID 91 displays a predetermined alarm image in accordance with an instruction from the control device 30. The MID 91 may be integrated with the touch panel 22 described above. That is, the "MID 91" in the following description may be interpreted as the "touch panel 22".

The buzzer 92 is configured to output a predetermined alarm sound. For example, the buzzer 92 outputs a predetermined alarm sound in accordance with an instruction from the control device 30. The buzzer 92 may be integrated with the speaker 23 described above. That is, the "buzzer 92" in the following description may be interpreted as the "speaker 23".

[2. Control Device]

Next, the control device 30 will be described in more details. The control device 30 includes, for example, a recognition unit 31, an acquisition unit 32, a processing unit 33 and a vehicle control unit 34 as functional units implemented by the processor executing a program stored in the storage unit of the control device 30. The control device 30 includes a storage unit 35 capable of storing information. The storage unit 35 is configured with, for example, a flash memory.

The recognition unit 31 recognizes a surrounding situation of the vehicle 1. For example, the recognition unit 31 performs sensor fusion processing on detection results obtained by some or all of the camera 111, the sonar 112, and the radar 113 in the external sensor 11, and recognizes the surrounding situation of the vehicle 1 based on a processing result.

The recognition unit 31 recognizes a position, a type, a speed, an acceleration, and the like of an object present around the vehicle 1 as the surrounding situation of the vehicle 1. At this time, the recognition unit 31 recognizes the position of the object as a position on absolute coordinates in which a representative point (for example, a center of gravity and a center of a drive shaft) of the vehicle 1 is set as an origin. Accordingly, a relative position between the vehicle 1 and the object present around can be recognized. In the absolute coordinate system, the position of the object may be represented using a representative point such as a center of gravity or a corner of the object, or may be represented as an area.

Examples of objects that can be recognized by the first recognition unit 31 include traffic participants such as other vehicles and pedestrians, division lines, curbs and separation zones that define lanes, and road structures such as guard rails and road shoulders. The first recognition unit 31 may recognize, for example, other road events such as a traffic light, a stop line, a crosswalk, a road sign, a branch, a junction, an interchange, and a tollbooth of a toll road.

As an example, the recognition unit 31 recognizes, from a peripheral image or the like captured by the camera 111, a traffic light present around the vehicle 1 and also recognizes the color thereof (for example, the color of a lighting unit that is turned on) based on recognition of at least one of a plurality of lighting units included in a general traffic light (for example, a green lighting unit that instructs "allow passage" or a red lighting unit that instructs "stop").

According to such a recognition unit 31, for example, in addition to the shape of the host lane which is the lane on which the vehicle 1 travels, it is possible to recognize a traffic light (hereinafter referred to as a "traffic light Sn" as well), other vehicles, and the like present around the vehicle 1.

In the following description, a road having the host lane, that is, a road on which the vehicle 1 travels is also referred to as a "travel path Rd1". Here, the travel path Rd1 may include, for example, another lane whose traveling direction is the same as that of the host lane, but does not include another lane whose traveling direction is opposite to the host lane (so-called "oncoming lane"). In the following description, a road intersecting the travel path Rd1 is also referred to as a "crossing road Rd2", and an intersection between the travel path Rd1 and the crossing road Rd2 is also referred to as an "intersection CP".

If the traffic light Sn is recognized by the recognition unit 31, the acquisition unit 32 acquires traffic light information including information indicating the position of the traffic light Sn (hereinafter, also referred to as "traffic light position information"), and stores the acquired traffic light information in the storage unit 35. The acquisition unit 32 can acquire the traffic light information at a predetermined cycle (for example, every 1 [s]) based on the recognition result by the recognition unit 31 in the period, and store the acquired traffic light information in the storage unit 35.

For example, the acquisition unit 32 identifies a location corresponding to the traffic light Sn (for example, coordinates for identifying one location on a map such as latitude and longitude; hereinafter referred to as a "traffic light position" as well) by referring to map information such as the map information database 24 based on the relative position between the traffic light Sn and the vehicle 1 recognized by the recognition unit 31 and the current position of the vehicle 1 identified by the navigation device 20 (for example, the GNSS receiver 21). Then, the acquisition unit 32 stores the traffic light information including the traffic light position information indicating the identified traffic light position in the storage unit 35.

The acquisition unit 32 may correct the traffic light position based on the lane position of the host lane on the travel path Rd1. As an example, it is assumed that the travel path Rd1 is a three-lane road and a left lane located on the leftmost side among the three lanes is the host lane. In this case, the acquisition unit 32 may set a location shifted by a predetermined distance (for example, 3 [m]) to the right side from the traffic light position identified as described above as the corrected traffic light position.

As another example, it is assumed that the travel path Rd1 is a three-lane road and a right lane located on the rightmost side among the three lanes is the host lane. In this case, the acquisition unit 32 may set a location shifted by a predetermined distance (for example, 3 [m]) to the left side from the traffic light position identified as described above as the corrected traffic light position.

As further another example, it is assumed that the travel path Rd1 is a three-lane road and a center lane located between the left lane and the right lane is the host lane. In this case, the acquisition unit 32 may directly adopt the traffic light position identified as described above as the traffic light position without particularly correcting the position.

In this way, by correcting the traffic light position based on the lane position of the host lane on the travel path Rd1, it is possible to obtain an appropriate position (for example, location) as the traffic light position regardless of the lane position of the host lane on the travel path Rd1. Since specific examples of the traffic light information will be described later, the description thereof will be omitted here.

Based on the traffic light information acquired by the acquisition unit 32, the processing unit 33 determines whether the traffic light Sn recognized by the recognition unit 31 is a traffic light corresponding to the travel path Rd1 on which the vehicle 1 travels. Here, the traffic light corresponding to the travel path Rd1 is, for example, a traffic light for performing instructions such as "allow passage (for example, light a green lighting unit)" or "stop (for example, light a red lighting unit)" to the vehicle 1 or the like traveling on the travel path Rd1.

Although details will be described later, the processing unit 33 sets a traffic light present range (hereinafter, also referred to as a "traffic light present range Ar") serving as a condition for determining a traffic light corresponding to the travel path Rd1 based on a plurality of pieces of traffic light information stored in the storage unit 35, and determines whether the traffic light Sn is a traffic light corresponding to the travel path Rd1 based on the traffic light information on the recognized traffic light Sn and the traffic light present range Ar.

The vehicle control unit 34 controls the vehicle 1 based on the processing result of the processing unit 33. The vehicle control unit 34 reflects the processing result of the processing unit 33 in the vehicle control, and the vehicle control is not particularly limited. For example, if the processing unit 33 determines that the recognized traffic light Sn is a traffic light corresponding to the travel path Rd1 and the traffic light Sn instructs "stop", the vehicle control unit 34 may control the vehicle 1 such that the vehicle 1 stops before a predetermined stop line on the travel path Rd1. In addition, if the processing unit 33 determines that the recognized traffic light Sn is a traffic light corresponding to the travel path Rd1 and the traffic light Sn instructs "stop", the vehicle control unit 34 may issue an alarm for calling the driver's attention via the alarm device 90 if the vehicle 1 does not decelerate while the distance from the vehicle 1 to the traffic light Sn is equal to or less than a predetermined value.

[3. Example of Processing Implemented with Functional Units of Control Device]

Hereinafter, an example of processing implemented with the functional units of the control device 30 will be described.

(Traffic Light Information)

First, an example of processing implemented by the acquisition unit 32 will be described. As described above, if the traffic light Sn is recognized by the recognition unit 31, the acquisition unit 32 acquires the traffic light information and stores the acquired traffic light information in the storage unit 35.

FIG. 2 illustrates an example of traffic light information stored in the storage unit 35 by the acquisition unit 32. The storage unit 35 is provided with, for example, a traffic light information table 35*a* illustrated in FIG. 2 as a storage area for storing the traffic light information. The traffic light information table 35*a* has fields corresponding to items such as traffic light information identifier (ID), traffic light position, nearest node, color, and acquisition time. The acquisition unit 32 stores the traffic light information in the storage unit 35 by setting information in each field of the traffic light information table 35*a*.

Here, the traffic light information ID is an identifier for identifying each piece of traffic light information. The traffic light position indicates a traffic light position of the recognized traffic light Sn (that is, a location corresponding to the traffic light Sn). The nearest node indicates a node closest in distance to the traffic light position of the recognized traffic light Sn among the nodes included in the map information such as the map information database 24. The color indicates the color of the recognized traffic light Sn, and indicates, for example, a lighting unit that is lit among the plurality of lighting units included in the traffic light Sn. The acquisition time indicates a time (for example, year, month, day, hour, minute, and second) at which each piece of traffic light information is acquired.

For example, the acquisition unit 32 refers to the recognition result by the recognition unit 31 at a predetermined cycle, and identifies the traffic light position and the color of the traffic light Sn when the traffic light Sn is recognized. Further, the acquisition unit 32 refers to the map information such as the map information database 24 and identifies the nearest node, which is the node closest to the traffic light position of the traffic light Sn among the nodes corresponding to the travel path Rd1. Then, the acquisition unit 32 stores, in the traffic light information table 35*a* (that is, the storage unit 35), traffic light information in which the identified traffic light position, color, nearest node, and time are associated with the traffic light information ID. The time is obtained by referring to, for example, a real time clock (RTC) (not illustrated) included in the control device 30.

In this way, the acquisition unit 32 can acquire the traffic light information including information indicating each of the traffic light position and the color of the recognized traffic light Sn and the acquisition time of the traffic light information, and store the acquired traffic light information in the storage unit 35.

Even for a plurality of pieces of traffic light information acquired for the same traffic light Sn, the traffic light positions indicated by the respective pieces of traffic light information are necessarily identical, and may vary due to the influence of a recognition error or the like by the recognition unit 31.

(Setting of Divided Areas)

Next, processing implemented the processing unit 33 will be described. The processing unit 33 sets the traffic light present range Ar through processes such as setting divided areas, extracting samples, setting reference points, and deriving boundary distances.

First, an example of the step of setting divided areas will be described. In this step, the processing unit 33 sets divided areas that are areas divided to the left and right relative to the traveling direction of the vehicle 1 using a first target link that is a link corresponding to the travel path Rd1 as a boundary.

In addition, if the recognized traffic light Sn is provided at the intersection CP of the travel path Rd1 and the crossing road Rd2, in this step, the processing unit 33 sets divided areas that are areas obtained by dividing into left and right relative to the traveling direction of the vehicle 1 using the first target link that is the link corresponding to the travel path Rd1 as a boundary and dividing into front and rear relative to the traveling direction of the vehicle 1 using a second target link that is a link corresponding to the crossing road Rd2 as a boundary. Accordingly, it is possible to set the traffic light present range Ar in accordance with the shape of the travel path Rd1 including the intersection CP intersecting the crossing road Rd2.

Hereinafter, an example of the step of setting the divided areas will be described more specifically with reference to FIG. 3.

Figure 3:
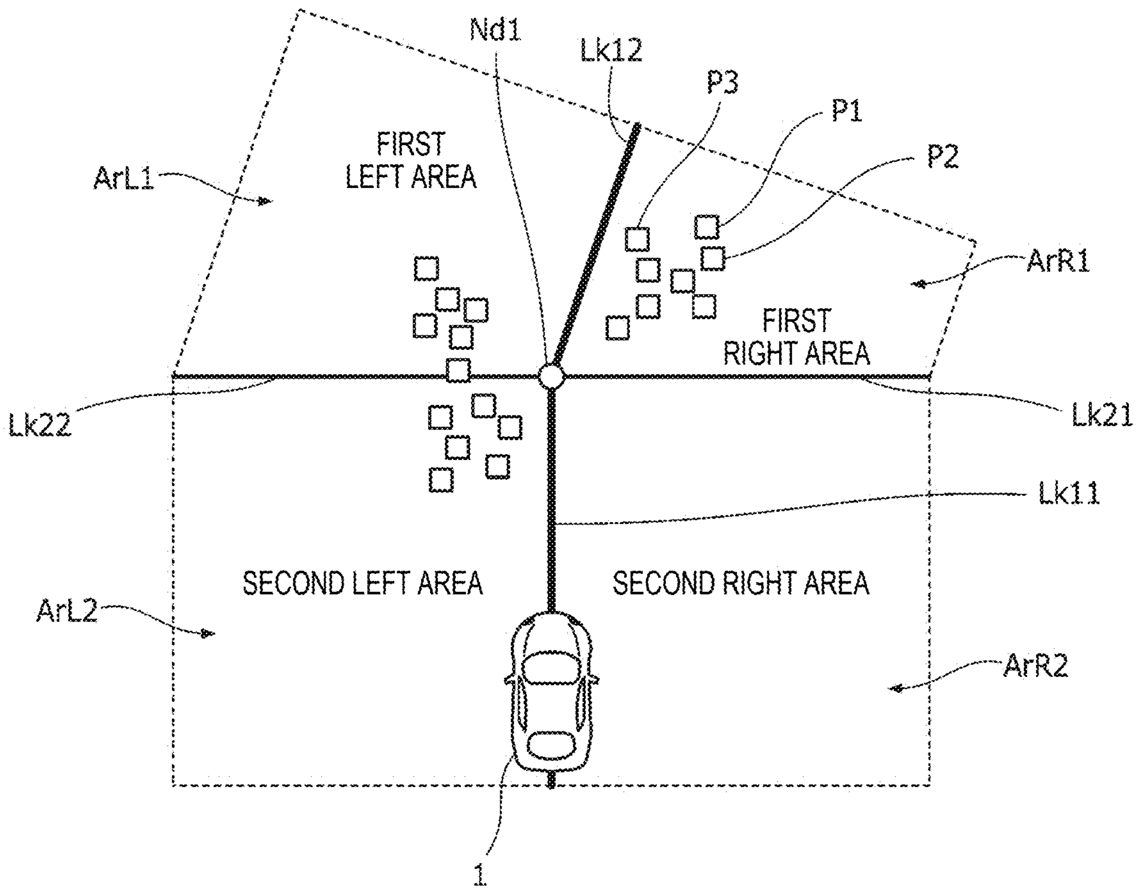
FIG. 3 illustrates an example of divided areas set by the processing unit 33.

FIG. 3 illustrates an example of divided areas set by the processing unit 33. In FIG. 3, a link Lk11 and a link Lk12 are links corresponding to the travel path Rd1 on which the vehicle 1 travels in the map information such as the map information database 24, and are links corresponding to the first target link described above. A link Lk21 and a link Lk22 are links corresponding to the crossing road Rd2 intersecting the travel path Rd1 in the map information such as the map information database 24, and are links corresponding to the second target link described above. A node Nd1 representing the intersection CP of the travel path Rd1 and the crossing road Rd2 is provided between the link Lk11 and the link Lk12 and between the link Lk21 and the link Lk22.

In this example, the vehicle 1 travels toward the intersection CP in a section corresponding to the link Lk11 of the travel path Rd1. The intersection CP is provided with a traffic light (not illustrated) corresponding to the travel path Rd1.

When the vehicle 1 approaches such an intersection CP, the traffic light provided at the intersection CP is recognized by the recognition unit 31 as the traffic light Sn present around the vehicle 1. The traffic light information on the traffic light Sn (that is, the traffic light provided at the intersection CP) is acquired by the acquisition unit 32 at a predetermined cycle and stored in the storage unit 35. As a result, a plurality of pieces of traffic light information on the traffic light Sn are stored in the storage unit 35. In FIG. 3, each "□" including the traffic light positions P1 to P3 represents the traffic light position indicated by each of the plurality of pieces of traffic light information stored in the storage unit 35.

In the case of this example, since the recognized traffic light Sn is provided at the intersection CP of the travel path Rd1 and the crossing road Rd2, the processing unit 33 sets divided areas obtained by dividing into left and right relative to the traveling direction of the vehicle 1 using the link Lk11 and the link Lk12 corresponding to the travel path Rd1 as boundaries and dividing into front and rear relative to the traveling direction of the vehicle 1 using the link Lk21 and the link Lk22 corresponding to the crossing road Rd2 as boundaries. As a result, in this example, as illustrated in FIG. 3, a first left area ArL1, a second left area ArL2, a first right area ArR1, and a second right area ArR2 are set as the divided areas.

As described above, if the recognized traffic light is provided at the intersection CP of the travel path Rd1 and the crossing road Rd2, it is possible to set a traffic light present range Ar according to the shape of the travel path Rd1 including the intersection CP intersecting the crossing road Rd2 by setting the divided areas obtained by dividing into left and right relative to the traveling direction of the vehicle 1 using the first target link corresponding to the travel path Rd1 as a boundary and dividing into front and rear relative to the traveling direction of the vehicle 1 using the second target link corresponding to the crossing road Rd2 as a boundary.

If the recognized traffic light Sn is not provided at the intersection CP, that is, if the link Lk21 and the link Lk22 illustrated in FIG. 3 are not present, the processing unit 33 may set a left area obtained by integrating the first left area ArL1 and the second left area ArL2 and a right area obtained by integrating the first right area ArR1 and the second right area ArR2 as the divided areas.

(Extraction of Samples)

Next, an example of the step of extracting samples will be described. In this step, for each of the set divided areas, the processing unit 33 derives a deviation that is a distance (more specifically, a minimum distance) between the first target link (that is, the link corresponding to the travel path Rd1) and each piece of traffic light information indicating a position within the divided area among the plurality of pieces of traffic light information stored in the storage unit 35, and extracts a predetermined ratio or a predetermined number of samples of the traffic light information in a descending order of the deviation. Hereinafter, an example of the step of extracting the samples will be described more specifically with reference to FIG. 4. In the following description, the same parts as those in FIG. 3 are denoted by the same reference signs, and the description thereof will be omitted or simplified.

Figure 4:
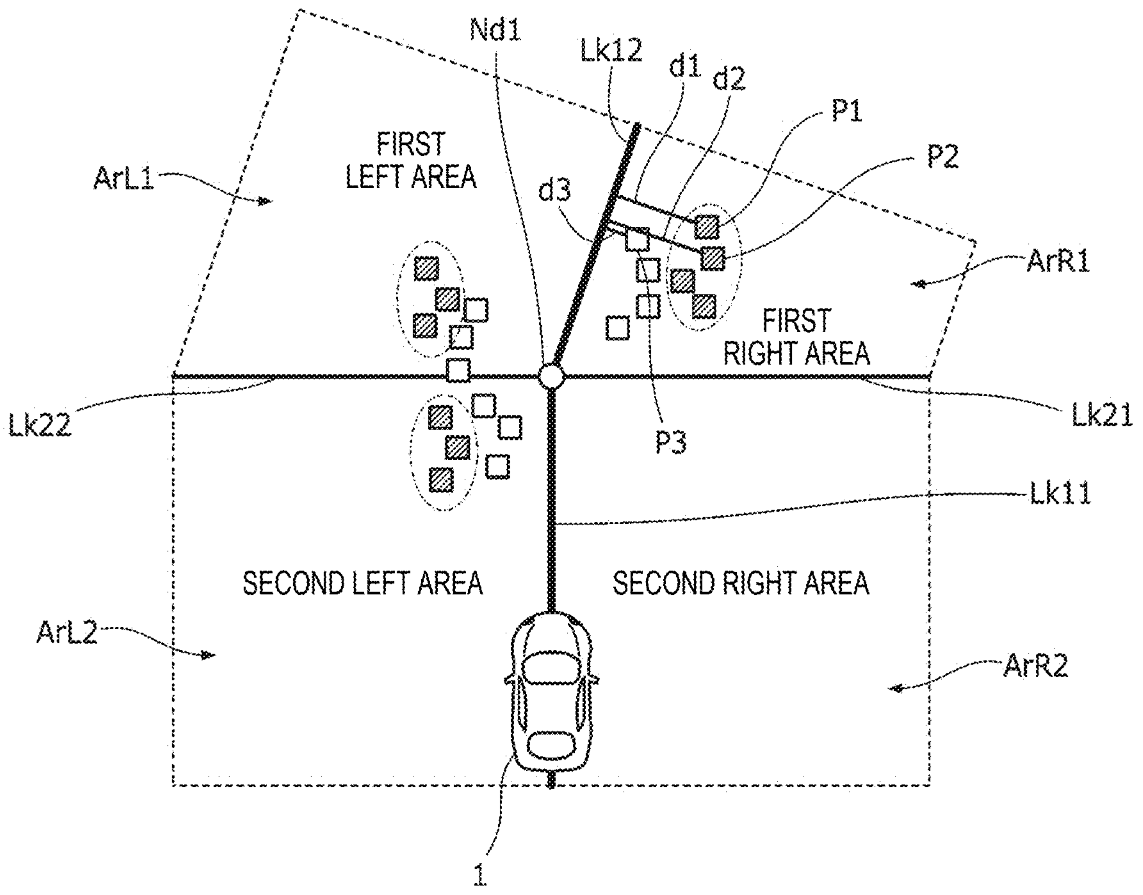
FIG. 4 illustrates an example of deviations derived by the processing unit 33 and the extracted sample.

FIG. 4 illustrates an example of deviations derived by the processing unit 33 and the extracted sample. In the example illustrated in FIG. 4, focusing on the first right area ArR1, the processing unit 33 derives, as the deviations, a distance between the link Lk12 that is the link of the travel path Rd1 as a boundary between the first left area ArL1 and the first right area ArR1 and each piece of traffic light information indicating the position within the first right area ArR1 such as the traffic light positions P1 to P3. As a result, a deviation d1 as a distance between the traffic light position P1 and the link Lk12, a deviation d2 as a distance between the traffic light position P2 and the link Lk12, a deviation d3 as a distance between the traffic light position P3 and the link Lk12, and the like are derived.

In this way, after deriving the deviation for each piece of the traffic light information indicating the position within the first right area ArR1, the processing unit 33 extracts, for example, a predetermined ratio (for example, the top 50 [%]) of samples of the traffic light information in a descending order of the derived deviation. As a result, in FIG. 4, traffic light information having traffic light positions surrounded by an ellipse indicated by a one-dot chain line in the first right area ArR1 is extracted as samples in the first right area ArR1.

Similarly, for the other set divided areas, the processing unit 33 derives a deviation for each piece of traffic light information indicating a position within the divided area, and extracts samples based on the derived deviation. As a result, in this example, traffic light information having traffic light positions surrounded by an ellipse indicated by a one-dot chain line in the first left area ArL1 is extracted as samples in the first left area ArL1, and traffic light information having a traffic light position surrounded by an ellipse indicated by a one-dot chain line in the second left area ArL2 is extracted as samples in the second left area ArL2. If no traffic light information indicating positions included in the divided area is present as in the second right area ArR2, samples are not extracted in the divided area.

In the example described here, a predetermined ratio of the traffic light information having top deviations is extracted as samples, but the present invention is not limited thereto. Instead, for example, a predetermined number (for example, five) of pieces of traffic light information having top deviations may be extracted as samples.

As described above, by extracting a predetermined ratio or a predetermined number of samples of the traffic light information in a descending order of the deviation in each divided area, it is possible to use only the traffic light information having top deviations as samples when setting the traffic light present range Ar. As a result, it is possible to prevent an excessively small traffic light present range Ar, and to set an appropriate traffic light present range Ar.

(Setting of Reference Points)

Next, an example of the step of setting the reference points will be described. In this step, for each set divided area, the processing unit 33 sets a reference point in the divided area based on an average position of the positions indicated by the samples extracted for the divided area. Hereinafter, an example of the step of setting the reference points will be described more specifically with reference to FIG. 5. In the following description, the same parts as those in FIG. 3 or 4 are denoted by the same reference signs, and the description thereof will be omitted or simplified.

Figure 5:
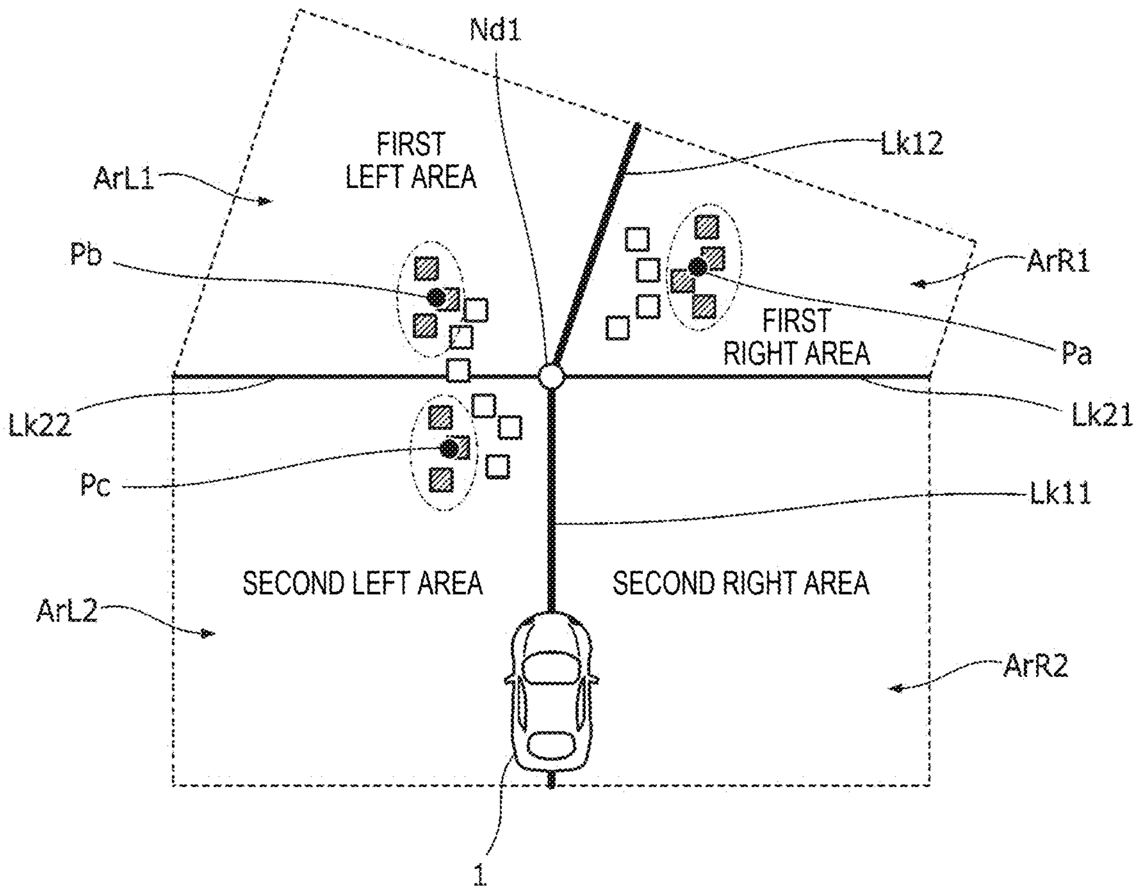
FIG. 5 illustrates an example of reference points set by the processing unit 33.

FIG. 5 illustrates an example of reference points set by the processing unit 33. In the example illustrated in FIG. 5, for example, it is assumed that traffic light information having a traffic light position surrounded by an ellipse indicated by a one-dot chain line in the first right area ArR1 is extracted as samples in the first right area ArR1. In this case, the processing unit 33 sets, as the reference point Pa of the first right area ArR1, an average position of the traffic light positions within the area surrounded by the ellipse indicated by the one-dot chain line in the first right area ArR1.

For the other set divided areas, the processing unit 33 similarly sets a reference point in the divided area based on an average position of the positions indicated by the samples extracted for the divided area. That is, for example, the processing unit 33 sets an average position of the traffic light positions within the area surrounded by the one-dot chain line in the first left area ArL1 as a reference point Pb of the first left area ArL1, and sets an average position of the traffic light positions within the area surrounded by the one-dot chain line in the second left area ArL2 as a reference point Pc of the second right area ArR2. No reference point is set for a divided area from which no samples are extracted, such as the second right area ArR2.

(Derivation of Boundary Distances)

Next, an example of the step of deriving the boundary distances will be described. In this step, for each set divided area, the processing unit 33 derives a distance between the reference point in the divided area and the first target link (that is, the link corresponding to the travel path Rd1) as the boundary distance. Hereinafter, an example of the step of deriving the boundary distances will be described more specifically with reference to FIG. 6. In the following description, the same parts as those in FIG. 3, 4, or 5 are denoted by the same reference signs, and the description thereof will be omitted or simplified.

Figure 6:
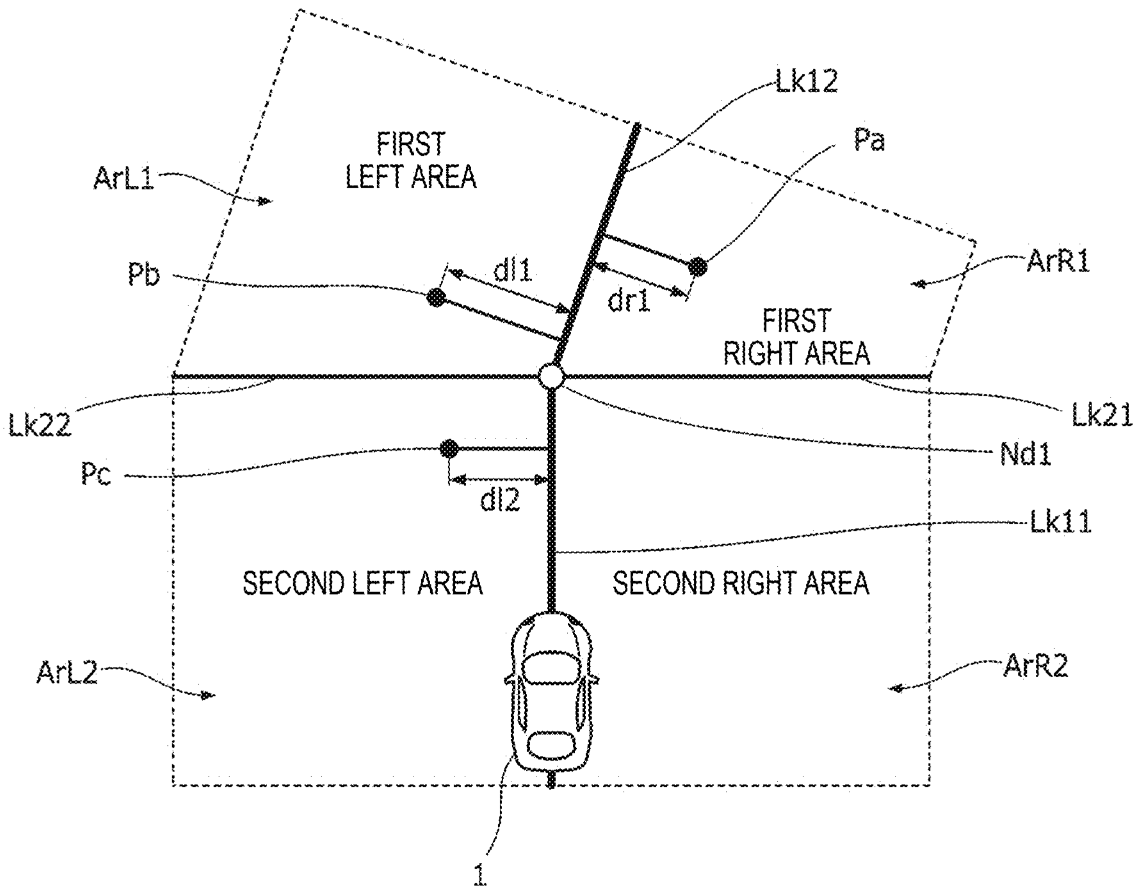
FIG. 6 illustrates an example of boundary distances derived by the processing unit 33.

FIG. 6 illustrates an example of boundary distances derived by the processing unit 33. In the example illustrated in FIG. 6, focusing on the first right area ArR1, the processing unit 33 derives, as a boundary distance dr1 for the first right area ArR1, a distance between the link Lk12 that is the link of the travel path Rd1 as a boundary between the first left area ArL1 and the first right area ArR1 and the reference point Pa of the first right area ArR1.

Similarly, focusing on the first left area ArL1, the processing unit 33 derives, as a boundary distance dl1 for the first left area ArL1, a distance between the link Lk12 that is the link of the travel path Rd1 as a boundary between the first left area ArL1 and the first right area ArR1 and the reference point Pb of the first left area ArL1.

In addition, focusing on the second left area ArL2, the processing unit 33 derives, as a boundary distance dl2 for the second left area ArL2, a distance between the link Lk11 that is the link of the travel path Rd1 as a boundary between the second left area ArL2 and the second right area ArR2 and the reference point Pc of the second left area ArL2. No boundary distances are not derived for a divided area in which no reference points are set, such as the second right area ArR2.

In one divided area, the number of pieces of traffic light information indicating positions within the divided area may be less than a predetermined number (for example, less than three) or the boundary distance obtained for the divided area may be less than a threshold. In this way, in one divided area, if the number of pieces of traffic light information indicating positions within the divided area is less than the predetermined number or the boundary distance obtained for the divided area is less than the threshold, the processing unit 33 may set the boundary distance corresponding to the divided area as the threshold. In this way, it is possible to prevent an excessively small traffic light present range Ar, and to set an appropriate traffic light present range Ar.

(Setting of Traffic Light Present Range)

Next, an example of the step of setting the traffic light present range Ar will be described. In this step, the processing unit 33 sets the traffic light present range Ar based on the boundary distance obtained for each of the set divided areas. Hereinafter, an example of the step of setting the traffic light present range Ar will be described more specifically with reference to FIG. 7. In the following description, the same parts as those in FIG. 3, 4, 5, or 6 are denoted by the same reference signs, and the description thereof will be omitted or simplified.

Figure 7:
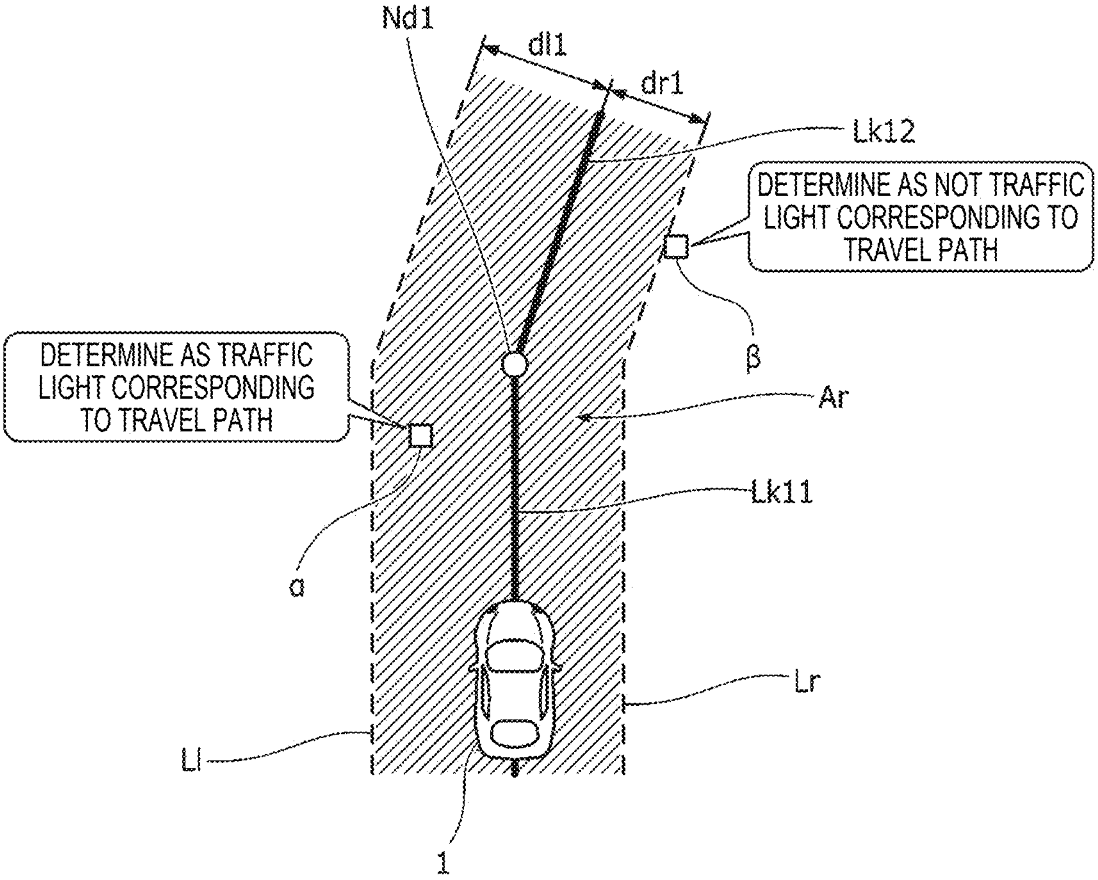
FIG. 7 illustrates an example of a traffic light present range Ar set by the processing unit 33.

FIG. 7 illustrates an example of the traffic light present range Ar set by the processing unit 33. In the example illustrated in FIG. 7, for example, as illustrated in FIG. 6, the boundary distance dr1 is obtained for the first right area ArR1, the boundary distance dl1 is obtained for the first left area ArL1, and the boundary distance dl2 is obtained for the second left area ArL2, and no boundary distances are obtained for the second right area ArR2. Here, the boundary distance dl1 of the first left area ArL1 is larger than the boundary distance dr2 of the second left area ArL2.

For example, the processing unit 33 sets the left boundary distance of the traffic light present range Ar based on the boundary distance of the left area among the set divided areas, and sets the right boundary distance of the traffic light present range Ar based on the boundary distance of the right area. More specifically, the processing unit 33 sets a largest boundary distance among the boundary distances of the left area as the left boundary distance of the traffic light present range Ar, and sets a largest boundary distance among the boundary distances of the right area as the right boundary distance of the traffic light present range Ar.

As a result, as in the present example, if there are the first left area ArL1 and the second left area ArL2 as the left area and the boundary distance is derived for each, the larger boundary distance dl1 between the boundary distance dl1 of the first left area ArL1 and the boundary distance dl2 of the second left area ArL2 is set as the left boundary distance of the traffic light present range Ar. Further, if there are the first right area ArR1 and the second right area ArR2 as the right area and the boundary distance is derived only for the first right area ArR1, for example, the boundary distance of the second right area ArR2 is regarded as "0", and the boundary distance dr1 of the first right area ArR1 is set as the right boundary distance of the traffic light present range Ar.

Then, the processing unit 33 sets, as the traffic light present range Ar, an area between a line L1 offset to the left by the above-described left boundary distance (dl1 in this example) and a line Lr offset to the right by the above-described right boundary distance (dr1 in this example) from the links (the link Lk11 and the link Lk12 in this example) corresponding to the travel path Rd1 (see the hatched area in FIG. 7).

After setting the traffic light present range Ar, the processing unit 33 may cause the storage unit 35 to store information indicating the set traffic light present range Ar. As an example, the processing unit 33 may cause the storage unit 35 to store, as information indicating the traffic light present range Ar, information in which information indicating the left boundary distance (dl1 in the above example) and the right boundary distance (dr1 in the above example) of the set traffic light present range Ar and information indicating the nearest node of the traffic light information used for setting the traffic light present range Ar (node Nd1 in the above example) are associated with each other. In this way, for example, the currently set traffic light present range Ar can be reused if the vehicle 1 travels on the travel path Rd1 and approaches the node Nd1 next time. Therefore, it is possible to reduce the processing load of the control device 30 when the vehicle 1 travels on the current travel path Rd1 next time.

(Determination as to Whether Traffic Light Corresponds to Travel Path Rd1)

The processing unit 33 determines whether the recognized traffic light Sn is a traffic light corresponding to the travel path Rd1 based on the traffic light information on the recognized traffic light Sn and the set traffic light present range Ar.

More specifically, if the traffic light position indicated by the traffic light information on the recognized traffic light Sn is within the traffic light present range Ar as indicated by a reference sign α in FIG. 7, the processing unit 33 determines that the recognized traffic light Sn is a traffic light corresponding to the travel path Rd1. On the other hand, if the traffic light position indicated by the traffic light information on the recognized traffic light Sn is not within the traffic light present range Ar as indicated by a reference sign β in FIG. 7, the processing unit 33 determines that the recognized traffic light Sn is not a traffic light corresponding to the travel path Rd1.

According to the control device 30 having the configuration described above, it is possible to determine whether the recognized traffic light Sn is a traffic light corresponding to the travel path Rd1 by using the traffic light present range Ar set based on the traffic light information acquired in the past based on the recognition result of the recognition unit 31. Accordingly, even if no position information on the traffic light is prepared in advance, it is possible to accurately determine whether the recognized traffic light Sn is a traffic light corresponding to the travel path Rd1, and to perform appropriate control according to the traffic light corresponding to the travel path Rd1. In addition, it is possible to improve traffic safety and contribute to development of a sustainable transportation system.

(Other Matters)

If the traffic light information including the information indicating the color of the recognized traffic light Sn is stored as illustrated in FIG. 2, it is possible to perform processing in consideration of the information indicating the color. For example, if a plurality of pieces of traffic light information having the same color as the recognized traffic light Sn are stored in the storage unit 35, the processing unit 33 may set the traffic light present range Ar based on the plurality of pieces of traffic light information (that is, a plurality of pieces of traffic light information having the same color as the recognized traffic light Sn). In this case, for example, the processing unit 33 may derive the deviation using only the plurality of pieces of traffic light information having the same color. In this way, finally, the traffic light present range Ar can be set using only the plurality of pieces of traffic light information having the same color.

In this way, by setting the traffic light present range Ar using the traffic light information having the same color as the recognized traffic light Sn, it is possible to prevent traffic light information on another traffic light from being used when setting the traffic light present range Ar, and to set an appropriate traffic light present range Ar suitable for determining whether the recognized traffic light Sn is a traffic light corresponding to the travel path Rd1.

In addition, if the traffic light information including the information indicating the acquisition time is stored as illustrated in FIG. 2, it is possible to perform processing in consideration of the information indicating the acquisition time. For example, if a plurality of pieces of traffic light information acquired within a past predetermined period (for example, one minute) based on the current time are stored in the storage unit 35, the processing unit 33 may set the traffic light present range Ar based on the plurality of pieces of traffic light information (that is, a plurality of pieces of traffic light information acquired within the past predetermined period). In this way, it is possible to prevent old traffic light information such as traffic light information acquired when, for example, the traffic light Sn is recognized from a distant place (in other words, traffic light information having poor positional accuracy), from being used for setting the traffic light present range Ar. This makes it possible to set an appropriate traffic light present range Ar.

If the change amount in the traffic light present range Ar in the predetermined period (for example, one minute) is less than a threshold, the processing unit 33 may stop the processing of setting the traffic light present range Ar. Accordingly, it is possible to stop the processing of setting the traffic light present range Ar at the time when the traffic light present range Ar is stabilized, and to reduce the subsequent processing load of the control device 30.

For example, when the vehicle 1 passes through the intersection CP (for example, the node Nd1 representing the intersection CP), the acquisition unit 32 may delete, from the storage unit 35, the traffic light information stored in the storage unit 35 before the vehicle 1 passes through the intersection CP. On the other hand, the processing unit 33 may cause the storage unit 35 to hold the information indicating the traffic light present range Ar stored in the storage unit 35 before the vehicle 1 passes through the intersection CP even after the vehicle 1 passes through the intersection CP. In this way, it is possible to reduce the processing load of the control device 30 when traveling on the current travel path Rd1 next time while reducing the storage area of the storage unit 35 exclusively used by the traffic light information.

[4. Example of Processing Procedure by Control Device]

Figure 8:
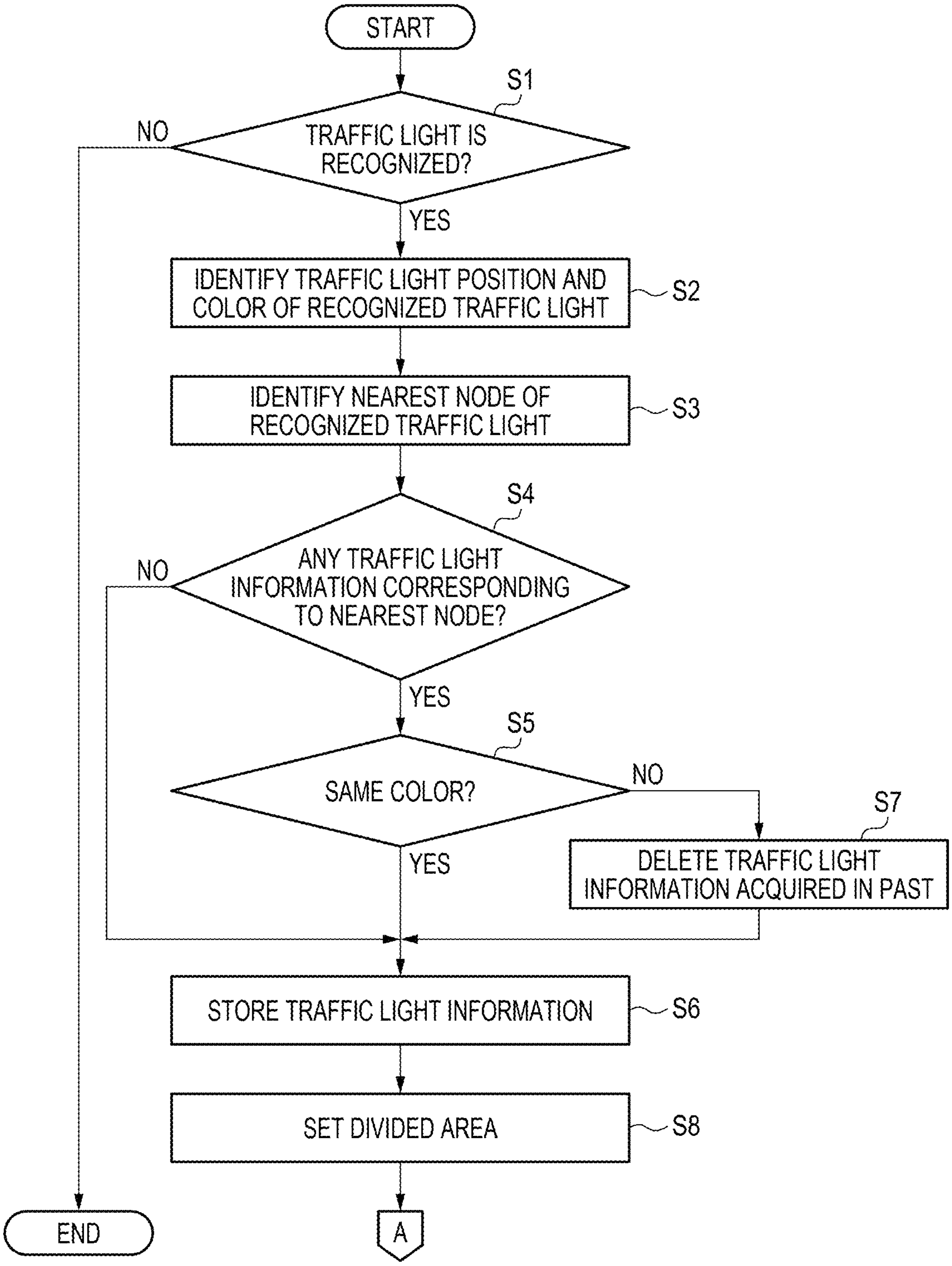
FIG. 8 is a flowchart (part 1) processing procedure illustrating an example of a processing procedure by the control device 30.
Figure 9:
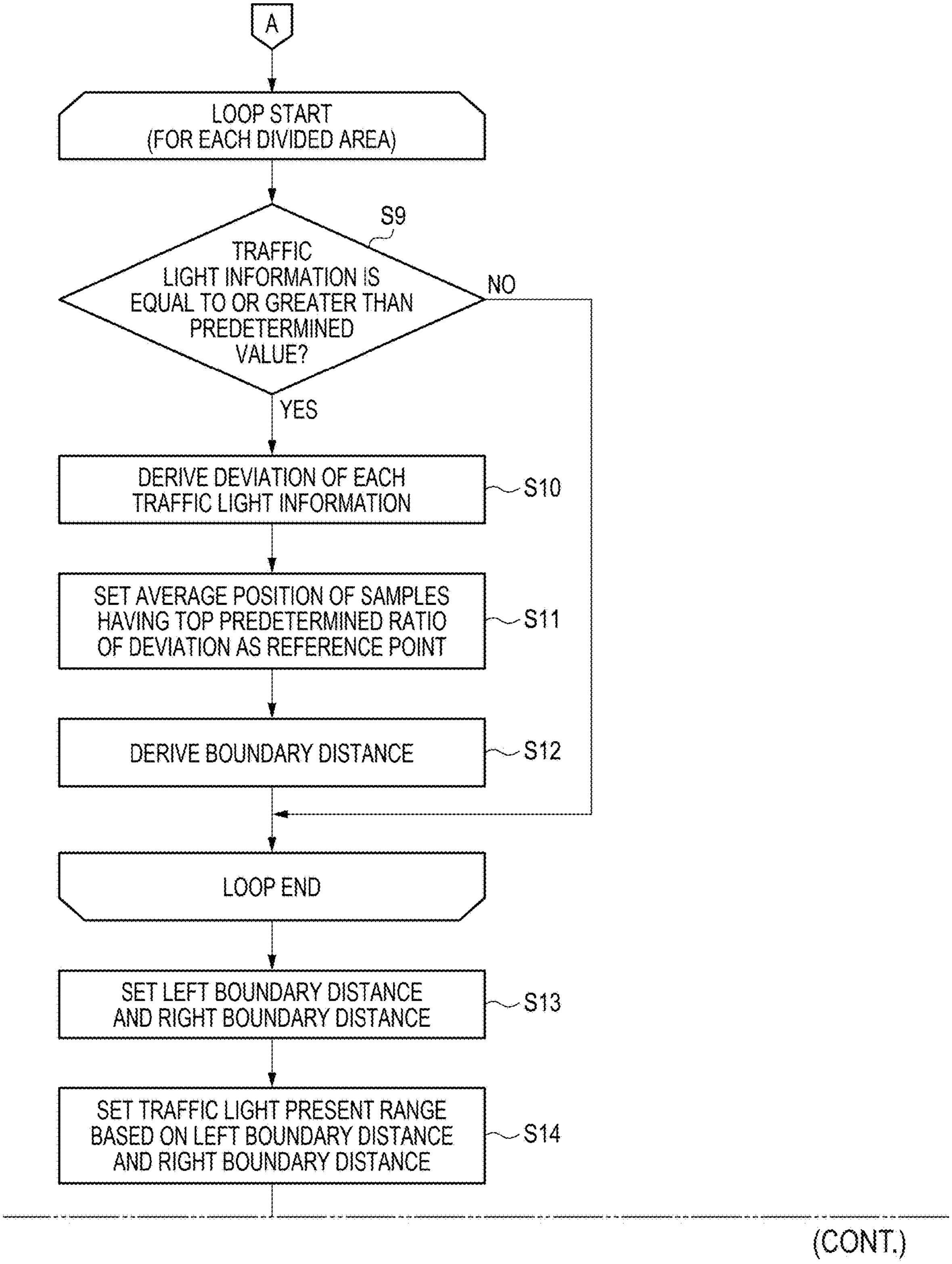
FIG. 9 is a flowchart (part 2) illustrating the example of the processing procedure by the control device 30.

Next, an example of a processing procedure by the control device 30 will be described. FIG. 8 is a flowchart (part 1) illustrating an example of the processing procedure by the control device 30. FIG. 9 is a flowchart (part 2) illustrating the example of the processing procedure by the control device 30. For example, when an ignition power supply of the vehicle 1 is turned on, the control device 30 executes a series of processing illustrated in FIGS. 8 and 9 at a predetermined cycle.

As illustrated in FIG. 9, the control device 30 determines whether the traffic light Sn present around the vehicle 1 is recognized (step S1). If the traffic light Sn is not recognized (step S1: NO), the control device 30 ends the series of processing illustrated in FIGS. 8 and 9.

If the traffic light Sn is recognized (step S1: YES), the control device 30 identifies the traffic light position and the color of the recognized traffic light Sn (step S2), and identifies the nearest node of the traffic light Sn (step S3).

Next, the control device 30 determines whether the traffic light information corresponding to the nearest node identified by the processing of step S4 is stored in the storage unit 35 (step S4). If it is determined that the traffic light information corresponding to the nearest node identified by the processing of step S4 is not stored in the storage unit 35 (step S4: NO), the control device 30 proceeds to the processing of step S6 described later.

On the other hand, if it is determined that the traffic light information corresponding to the nearest node identified by the processing of step S4 is stored in the storage unit 35 (step S4: YES), the control device 30 determines whether the color indicated by the traffic light information stored in the storage unit 35 and the color of the currently recognized traffic light Sn are the same (step S5).

If it is determined that the color of the currently recognized traffic light Sn is the same as the color of the traffic light information stored in the storage unit 35 (step S5: YES), the control device 30 acquires the traffic light information on the currently recognized traffic light Sn based on the processing results of step S2 and step S3, stores the traffic light information in the storage unit 35 (step S6), and proceeds to the processing of step S8.

On the other hand, if it is determined that the color of the currently recognized traffic light Sn is different from the color of the traffic light information stored in the storage unit 35 (step S5: NO), the control device 30 deletes, from the storage unit 35, the traffic light information corresponding to the nearest node identified by the processing of step S4 (in other words, the traffic light information acquired in the past) (step S7), and then proceeds to the processing of step S6 to store the traffic light information on the currently recognized traffic light Sn in the storage unit 35. Accordingly, if the color of the recognized traffic light Sn is changed, the traffic light information suitable for the changed color can be accumulated alone in the storage unit 35.

Next, the control device 30 sets the divided areas on a work area provided in the storage unit 35 or the like as described above (step S8), and performs the processing of step S9 to step S12 illustrated in FIG. 9 for each of the set divided areas.

Specifically, the control device 30 first determines whether the number of pieces of traffic light information indicating, as traffic light positions, positions within the divided area as the current processing target among the plurality of pieces of traffic light information stored in the storage unit 35 is equal to or greater than a predetermined number (step S9).

If it is determined that the number of pieces of corresponding traffic light information is not equal to or greater than the predetermined number (step S9: NO), the control device 30 directly ends the series of processing for the divided area as the current processing target. In this case, the control device 30 may set the boundary distance for the divided area as the current processing target as a predetermined threshold and end the series of processing.

If it is determined that the number of pieces of corresponding traffic light information is equal to or greater than the predetermined number (step S9: YES), the control device 30 derives the deviation for each piece of corresponding traffic light information (step S10).

Next, based on the processing result of step S10, the control device 30 extracts a predetermined ratio of samples of the traffic light information in a descending order of the deviation, and sets an average position of the extracted samples as a reference point for the divided area as the current processing target (step S11).

Then, the control device 30 derives the boundary distance for the divided area as the current processing target based on the reference point set by the processing of step S11 (step S12), and ends the series of processing for the divided area as the current processing target.

When the processing of step S9 to step S12 is performed for each of the set divided areas, the control device 30 sets the left boundary distance and the right boundary distance of the traffic light present range Ar based on the processing results thereof (step S13). Then, the control device 30 sets the traffic light present range Ar based on the left boundary distance and the right boundary distance set by the processing of step S13 (step S14).

Next, the control device 30 determines whether the traffic light position indicated by the traffic light information acquired by the latest processing of step S6 is within the traffic light present range Ar set by the processing of step S14 (step S15).

If it is determined that the traffic light position indicated by the latest acquired traffic light information is within the traffic light present range Ar (step S15: Yes), the control device 30 determines that the currently recognized traffic light Sn is a traffic light corresponding to the travel path Rd1 (step S16), and ends the series of processing illustrated in FIGS. 8 and 9.

On the other hand, if it is determined that the traffic light position indicated by the latest acquired traffic light information is not within the traffic light present range Ar (step S15: NO), the control device 30 determines that the currently recognized traffic light Sn is not a traffic light corresponding to the travel path Rd1 (step S17), and ends the series of processing illustrated in FIGS. 8 and 9.

As described above, according to the control device 30, it is possible to determine whether the recognized traffic light Sn is a traffic light corresponding to the travel path Rd1 by using the traffic light present range Ar set based on the traffic light information acquired in the past based on the recognition result of the recognition unit 31. Accordingly, even if no position information on the traffic light is prepared in advance, it is possible to accurately determine whether the recognized traffic light Sn is a traffic light corresponding to the travel path Rd1, and to perform appropriate control according to the traffic light corresponding to the travel path Rd1. In addition, it is possible to improve traffic safety and contribute to development of a sustainable transportation system.

The control method described in the present embodiment can be implemented by a computer executing a program (control program) prepared in advance. The control program is stored in, for example, a computer-readable storage medium and executed by being read from the storage medium. In addition, the control program may be provided in a form stored in a non-volatile (non-transitory) storage medium such as a flash memory, or may be provided via a network such as the Internet. In the present embodiment, a computer that executes the present control program is a control device 30 (for example, a processor of the control device 30), but is not limited thereto. The computer that executes the control program may be included in the vehicle 1 or may be included in the external device 2 that can communicate with the vehicle 1.

Although an embodiment of the present invention has been described above, it goes without saying that the present invention is not limited to the embodiment. It is apparent that those skilled in the art can conceive of various modifications and alterations within the scope described in the claims, and it is understood that such modifications and alterations naturally fall within the technical scope of the present invention.

In the present specification, at least the following matters are described. Although corresponding constituent elements and the like in the above embodiment are shown in parentheses, the present invention is not limited thereto.

(1) A vehicle control device (control device 30) for controlling a vehicle (vehicle 1), including:

a recognition unit (recognition unit 31) configured to recognize a surrounding situation of the vehicle;

an acquisition unit (acquisition unit 32) configured to, if a traffic light is recognized by the recognition unit, acquire traffic light information including information indicating a position of the traffic light, and store the traffic light information in a storage unit (storage unit 35);

a processing unit (processing unit 33) configured to determine whether the recognized traffic light is a traffic light corresponding to a travel path on which the vehicle travels, based on the traffic light information acquired by the acquisition unit; and a vehicle control unit (vehicle control unit 34) configured to control the vehicle based on a processing result of the processing unit, in which the acquisition unit is configured to acquire the traffic light information at a predetermined cycle based on a recognition result by the recognition unit at each cycle and store the traffic light information in the storage unit, and if a plurality of pieces of traffic light information are stored in the storage unit, the processing unit sets a traffic light present range (traffic light present range Ar) serving as a condition for determining a traffic light corresponding to the travel path based on the plurality of pieces of traffic light information, and determines whether the recognized traffic light is a traffic light corresponding to the travel path based on the traffic light information on the recognized traffic light and the set traffic light present range.

According to (1), it is possible to determine whether the recognized traffic light is a traffic light corresponding to the travel path on which the host vehicle travels by using the traffic light present range set based on the traffic light information acquired in the past based on the recognition result of the recognition unit. Accordingly, even if no position information on the traffic light is prepared in advance, it is possible to accurately determine whether the recognized traffic light is a traffic light corresponding to the travel path, and to perform appropriate control according to the traffic light corresponding to the travel path. In addition, it is possible to improve traffic safety and contribute to development of a sustainable transportation system.

(2) The vehicle control device according to (1), in which the processing unit determines that the recognized traffic light is a traffic light corresponding to the travel path if the position indicated by the traffic light information on the recognized traffic light is within the traffic light present range, and determines that the recognized traffic light is not a traffic light corresponding to the travel path if the position indicated by the traffic light information on the recognized traffic light is not within the traffic light present range.

According to (2), it is possible to accurately determine whether the recognized traffic light is a traffic light corresponding to the travel path.

(3) The vehicle control device according to (1) or (2), in which the acquisition unit acquires the traffic light information including information indicating a color of the recognized traffic light and stores the traffic light information in the storage unit, and if the plurality of pieces of traffic light information having the same color as the recognized traffic light are stored in the storage unit, the processing unit sets the traffic light present range based on the plurality of pieces of traffic light information.

According to (3), it is possible to set the traffic light present range using traffic light information having the same color as the recognized traffic light. Accordingly, it is possible to prevent traffic light information on another traffic light from being used when setting the traffic light present range, and to set an appropriate traffic light present range.

(4) The vehicle control device according to any one of (1) to (3), in which the vehicle control device is configured to refer to map information (map information database 24) including road network information indicating each road by a combination of nodes (node Nd1) and a link (link Lk11, Lk12, Lk21, Lk22) connecting the nodes, and the processing unit sets divided areas (first left area ArL1, second left area ArL2, first right area ArR1 and second right area ArR2) that are areas divided into left and right relative to a traveling direction of the vehicle using, as a boundary, a first target link (links Lk11 and Lk12) that is a link corresponding to the travel path, and for each of the divided areas, derives a deviation (deviations d1, d2 and d3) that is a distance between the first target link and each piece of traffic light information indicating a position within the divided area among the plurality of pieces of traffic light information, extracts a predetermined ratio or a predetermined number of samples of the traffic light information in a descending order of the deviation, sets a reference point (reference points Pa, Pb, and Pc) in the divided area based on an average position of positions indicated by the respective samples, and derives a boundary distance (boundary distance dr1, dl1, dl2) that is a distance between the reference point and the first target link, and sets the traffic light present range based on the boundary distance obtained for each of the divided areas.

According to (4), it is possible to use only the traffic light information having top deviations as samples when setting the traffic light present range. As a result, it is possible to prevent an excessively small traffic light present range, and to set an appropriate traffic light present range.

(5) The vehicle control device according to (4), in which if the recognized traffic light is provided at an intersection between the travel path and a crossing road intersecting the travel path, the processing unit sets the divided areas that are areas obtained by dividing into left and right relative to the traveling direction of the vehicle using the first target link as a boundary and dividing into front and rear relative to the traveling direction of the vehicle using a second target link (links Lk21 and Lk22) that is a link corresponding to the crossing road as a boundary.

According to (5), it is possible to set the traffic light present range in accordance with the shape of the travel path including the intersection intersecting the crossing road.

(6) The vehicle control device according to (4) or (5), in which in one divided area, if traffic light information indicating a position within the divided area is less than a predetermined number or the boundary distance obtained for the divided area is less than a threshold, the processing unit sets the boundary distance corresponding to the divided area as the threshold.

According to (6), it is possible to set an appropriate traffic light present range.

(7) The vehicle control device according to any one of (1) to (6), in which the processing unit sets the traffic light present range at a predetermined cycle based on the plurality of pieces of traffic light information stored in the storage unit at each cycle, and stops processing of setting the traffic light present range if a change amount in the traffic light present range in the predetermined period is less than a threshold.

According to (7), it is possible to stop the processing of setting the traffic light present range at the time when the traffic light present range is stabilized, and to reduce the subsequent processing load of the vehicle control device.

(8) The vehicle control device according to any one of (1) to (7), in which the acquisition unit acquires the traffic light information including information indicating an acquisition time and stores the traffic light information in the storage unit, and if the plurality of pieces of traffic light information acquired within a predetermined period in the past based on a current time are stored in the storage unit, the processing unit sets the traffic light present range based on the plurality of pieces of traffic light information.

According to (8), it is possible to prevent old traffic light information such as traffic light information acquired when, for example, the traffic light is recognized from a distant place (in other words, traffic light information having poor positional accuracy), from being used for setting the traffic light present range. This makes it possible to set an appropriate traffic light present range.

(9) The vehicle control device according to any one of (1) to (8), in which if the recognized traffic light is provided at an intersection between the travel path and a crossing road intersecting the travel path, when the vehicle passes through the intersection, the acquisition unit deletes, from the storage unit, the traffic light information stored in the storage unit before the vehicle passes through the intersection, and the processing unit stores the information indicating the traffic light present range in the storage unit and causes the storage unit to hold the information indicating the traffic light present range even after the vehicle passes through the intersection.

According to (9), it is possible to reduce the processing load when traveling on the current travel path next time while reducing the storage area of the storage unit exclusively used by the traffic light information.

(10) A control method of a computer (control device 30) for controlling a vehicle performing processing including:

recognizing a surrounding situation of the vehicle;

if a traffic light is recognized, acquiring traffic light information including information indicating a position of the traffic light, and storing the traffic light information in a storage unit (storage unit 35) (step S6);

determining whether the recognized traffic light is a traffic light corresponding to a travel path on which the vehicle travels, based on the traffic light information (steps S8 to S16); and controlling the vehicle based on a determination result as to whether the recognized traffic light is a traffic light corresponding to the travel path, in which in the processing of acquiring the traffic light information, the traffic light information can be acquired at a predetermined cycle based on a recognition result of the surrounding situation at each cycle and the traffic light information can be stored in the storage unit, and in the processing of determining whether the recognized traffic light is a traffic light corresponding to the travel path, if a plurality of pieces of traffic light information are stored in the storage unit, a traffic light present range (traffic light present range Ar) serving as a condition for determining a traffic light corresponding to the travel path is set based on the plurality of pieces of traffic light information (step S14), and whether the recognized traffic light is a traffic light corresponding to the travel path is determined based on the traffic light information on the recognized traffic light and the set traffic light present range (step S15).

According to (10), it is possible to determine whether the recognized traffic light is a traffic light corresponding to the travel path on which the host vehicle travels by using the traffic light present range set based on the traffic light information acquired in the past based on the recognition result of the surrounding situation of the host vehicle. Accordingly, even if no position information on the traffic light is prepared in advance, it is possible to accurately determine whether the recognized traffic light is a traffic light corresponding to the travel path, and to perform appropriate control according to the traffic light corresponding to the travel path. In addition, it is possible to improve traffic safety and contribute to development of a sustainable transportation system.

(11) A control program for causing a computer (control device 30) for controlling a vehicle to perform processing including:

recognizing a surrounding situation of the vehicle;

if a traffic light is recognized, acquiring traffic light information including information indicating a position of the traffic light, and storing the traffic light information in a storage unit (storage unit 35) (step S6);

determining whether the recognized traffic light is a traffic light corresponding to a travel path on which the vehicle travels, based on the traffic light information (steps S8 to S16); and controlling the vehicle based on a determination result as to whether the recognized traffic light is a traffic light corresponding to the travel path, in which in the processing of acquiring the traffic light information, the traffic light information can be acquired at a predetermined cycle based on a recognition result of the surrounding situation at each cycle and the traffic light information can be stored in the storage unit, and in the processing of determining whether the recognized traffic light is a traffic light corresponding to the travel path, if a plurality of pieces of traffic light information are stored in the storage unit, a traffic light present range (traffic light present range Ar) serving as a condition for determining a traffic light corresponding to the travel path is set based on the plurality of pieces of traffic light information (step S14), and whether the recognized traffic light is a traffic light corresponding to the travel path is determined based on the traffic light information on the recognized traffic light and the set traffic light present range (step S15).

According to (11), it is possible to determine whether the recognized traffic light is a traffic light corresponding to the travel path on which the host vehicle travels by using the traffic light present range set based on the traffic light information acquired in the past based on the recognition result of the surrounding situation of the host vehicle. Accordingly, even if no position information on the traffic light is prepared in advance, it is possible to accurately determine whether the recognized traffic light is a traffic light corresponding to the travel path, and to perform appropriate control according to the traffic light corresponding to the travel path. In addition, it is possible to improve traffic safety and contribute to development of a sustainable transportation system.

REFERENCE SIGNS LIST

1 vehicle
24 map information database (map information)
30 control device (vehicle control device)
31 recognition unit
32 acquisition unit
33 processing unit
34 vehicle control unit
35 storage unit
Ar traffic light present range
ArL1 first left area (divided area)
ArL2 second left area (divided area)
ArR1 first right area (divided area)
ArR2 second right area (divided area)
dr1, dl1, d12 boundary distance
Lk11, Lk12 link (first target link)
Lk21, Lk22 link (second target link)
Nd1 node
Pa, Pb, Pc reference point

What is claimed is:

1. A vehicle control device for controlling a vehicle, comprising:

a recognition unit configured to recognize a surrounding situation of the vehicle;

an acquisition unit configured to, in a case where a traffic light is recognized by the recognition unit, acquire traffic light information including information indicating a position of the traffic light, and store the traffic light information in a memory;

a processing unit configured to determine whether the recognized traffic light is a traffic light corresponding to a travel path on which the vehicle travels, based on the traffic light information acquired by the acquisition unit; and a vehicle control unit configured to control the vehicle based on a processing result of the processing unit, wherein the acquisition unit is configured to acquire the traffic light information at a predetermined cycle based on a recognition result by the recognition unit at each cycle and store the traffic light information in the memory, in a case where a plurality of pieces of the traffic light information are stored in the memory, the processing unit sets a traffic light present range serving as a condition for determining a traffic light corresponding to the travel path based on the plurality of pieces of the traffic light information, and determines whether the recognized traffic light is a traffic light corresponding to the travel path based on the traffic light information on the recognized traffic light and the set traffic light present range, the processing unit determines that the recognized traffic light is a traffic light corresponding to the travel path in a case where the position indicated by the traffic light information on the recognized traffic light is within the traffic light present range, and determines that the recognized traffic light is not a traffic light corresponding to the travel path in a case where the position indicated by the traffic light information on the recognized traffic light is not within the traffic light present range, and the recognition unit, the acquisition unit, the processing unit, and the vehicle control unit are each implemented via at least one processor.

2. The vehicle control device according to claim 1, wherein the acquisition unit acquires the traffic light information including information indicating a color of the recognized traffic light and stores the traffic light information in the memory, and in a case where the plurality of pieces of the traffic light information having same color as the recognized traffic light are stored in the memory, the processing unit sets the traffic light present range based on the plurality of pieces of the traffic light information.

3. The vehicle control device according to claim 1, wherein the vehicle control device is configured to refer to map information including road network information indicating each road by a combination of nodes and a link connecting the nodes, and the processing unit sets divided areas that are areas divided into left and right relative to a traveling direction of the vehicle using, as a boundary, a first target link that is a link corresponding to the travel path, for each of the divided areas, derives a deviation that is a distance between the first target link and each piece of the traffic light information indicating a position within the divided area among the plurality of pieces of the traffic light information, extracts a predetermined ratio or a predetermined number of samples of the traffic light information in a descending order of the deviation, sets a reference point in the divided area based on an average position of positions indicated by the respective samples, and derives a boundary distance that is a distance between the reference point and the first target link, and sets the traffic light present range based on the boundary distance obtained for each of the divided areas.

4. The vehicle control device according to claim 3, wherein in a case where the recognized traffic light is provided at an intersection between the travel path and a crossing road intersecting the travel path, the processing unit sets the divided areas that are areas obtained by dividing into left and right relative to the traveling direction of the vehicle using the first target link as a boundary and dividing into front and rear relative to the traveling direction of the vehicle using, as a boundary, a second target link that is a link corresponding to the crossing road.

5. The vehicle control device according to claim 3, wherein in one of the divided areas, in a case where the traffic light information indicating a position within the one of the divided areas is less than a predetermined number or the boundary distance obtained for the one of the divided areas is less than a threshold, the processing unit sets the boundary distance corresponding to the one of the divided areas as the threshold.

6. The vehicle control device according to claim 1, wherein the processing unit sets the traffic light present range at a predetermined cycle based on the plurality of pieces of the traffic light information stored in the memory at each cycle, and stops processing of setting the traffic light present range in a case where a change amount in the traffic light present range in a predetermined period is less than a threshold.

7. The vehicle control device according to claim 1, wherein the acquisition unit acquires the traffic light information including information indicating an acquisition time and stores the traffic light information in the memory, and in a case where the plurality of pieces of the traffic light information acquired within a predetermined period in past based on a current time are stored in the memory, the processing unit sets the traffic light present range based on the plurality of pieces of the traffic light information.

8. The vehicle control device according to claim 1, wherein in a case where the recognized traffic light is provided at an intersection between the travel path and a crossing road intersecting the travel path, in a case where the vehicle passes through the intersection, the acquisition unit deletes, from the memory, the traffic light information stored in the memory before the vehicle passes through the intersection, and the processing unit stores the information indicating the traffic light present range in the memory and causes the memory to hold the information indicating the traffic light present range even after the vehicle passes through the intersection.

9. A control method, by a computer for controlling a vehicle, comprising:

recognizing a surrounding situation of the vehicle;

in a case where a traffic light is recognized, acquiring traffic light information including information indicating a position of the traffic light, and storing the traffic light information in a memory;

determining whether the recognized traffic light is a traffic light corresponding to a travel path on which the vehicle travels, based on the traffic light information; and controlling the vehicle based on a determination result as to whether the recognized traffic light is a traffic light corresponding to the travel path, wherein in the acquiring of the traffic light information, the traffic light information is capable of being acquired at a predetermined cycle based on a recognition result of the surrounding situation at each cycle so that the traffic light information is stored in the memory, in the determining whether the recognized traffic light is a traffic light corresponding to the travel path, in a case where a plurality of pieces of the traffic light information are stored in the memory, a traffic light present range serving as a condition for determining a traffic light corresponding to the travel path is set based on the plurality of pieces of the traffic light information, and whether the recognized traffic light is a traffic light corresponding to the travel path is determined based on the traffic light information on the recognized traffic light and the set traffic light present range, and the determination of whether the recognized traffic light is a traffic light further includes determining that the recognized traffic light is a traffic light corresponding to the travel path in a case where the position indicated by the traffic light information on the recognized traffic light is within the traffic light present range, and determining that the recognized traffic light is not a traffic light corresponding to the travel path in a case where the position indicated by the traffic light information on the recognized traffic light is not within the traffic light present range.

10. A non-transitory computer readable medium storing a control program for causing a computer for controlling a vehicle to perform processing including:

recognizing a surrounding situation of the vehicle;

in a case where a traffic light is recognized, acquiring traffic light information including information indicating a position of the traffic light, and storing the traffic light information in a memory;

determining whether the recognized traffic light is a traffic light corresponding to a travel path on which the vehicle travels, based on the traffic light information; and controlling the vehicle based on a determination result as to whether the recognized traffic light is a traffic light corresponding to the travel path, wherein in the acquiring of the traffic light information, the traffic light information is capable of being acquired at a predetermined cycle based on a recognition result of the surrounding situation at each cycle so that the traffic light information is stored in the memory, in the determining whether the recognized traffic light is a traffic light corresponding to the travel path, in a case where a plurality of pieces of the traffic light information are stored in the memory, a traffic light present range serving as a condition for determining a traffic light corresponding to the travel path is set based on the plurality of pieces of the traffic light information, and whether the recognized traffic light is a traffic light corresponding to the travel path is determined based on the traffic light information on the recognized traffic light and the set traffic light present range, and the determination of whether the recognized traffic light is a traffic light further includes determining that the recognized traffic light is a traffic light corresponding to the travel path in a case where the position indicated by the traffic light information on the recognized traffic light is within the traffic light present range, and determining that the recognized traffic light is not a traffic light corresponding to the travel path in a case where the position indicated by the traffic light information on the recognized traffic light is not within the traffic light present range.

* * * * *